United States Patent
Rossi et al.

(10) Patent No.: US 10,281,291 B2
(45) Date of Patent: May 7, 2019

(54) GRAPHICAL USER INTERFACE FOR SMOOTH ANIMATION RENDERING OF PROBE POINTS

(71) Applicant: HERE Global B.V., Eindhoven (NL)

(72) Inventors: Andrea Rossi, Berlin (DE); Alexis Durocher, Crespières (FR)

(73) Assignee: HERE Global B.V., Eindhoven (NL)

( * ) Notice: Subject to any disclaimer, the term of this patent is extended or adjusted under 35 U.S.C. 154(b) by 3 days.

(21) Appl. No.: 15/609,332

(22) Filed: May 31, 2017

(65) Prior Publication Data

US 2018/0347998 A1    Dec. 6, 2018

(51) Int. Cl.
G01C 21/34 (2006.01)
G06T 17/05 (2011.01)

(52) U.S. Cl.
CPC .......... *G01C 21/3476* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 9,508,002 B2 | 11/2016 | Barcay | |
| 2005/0143909 A1 | 6/2005 | Orwant | |
| 2012/0015778 A1* | 1/2012 | Lee | A63B 71/0622 482/8 |
| 2012/0218191 A1* | 8/2012 | Huang | G06F 1/1643 345/173 |

FOREIGN PATENT DOCUMENTS

JP    2001-159529 A    6/2001

OTHER PUBLICATIONS

De Marchi, Massimo, "Visualizing Public Transport Systems: State-of-the-Art and Future Challenges", University of Illinois at Chicago, Mar. 2015, 10 pages, retrieved from <http://webcache.googleusercontent.com/search?q=cache:aBLV6kD1-IgJ:creativecoding.evl.uic.edu/courses/cs524/RESEARCH/DeMarchi_Transit.pdf+&cd=1&hl=en&ct=clnk&gl=us> on Aug. 28, 2017.

Islam, Md. Baharul, "Motion Control Along Different Smooth Curves Using Arc Length Parameterization", Journal of Modern Science and Technology, May 2013, pp. 84-95, vol. 1, No. 1, G. J. Publications, India.

(Continued)

*Primary Examiner* — Yingchun He
(74) *Attorney, Agent, or Firm* — Alston & Bird LLP

(57) ABSTRACT

A map and a marker corresponding to an object of interest are displayed via a user interface of a user apparatus. The marker is displayed on the map at a current marker position. Location data is received by the user apparatus, the location data comprises an instance of location data corresponding to the object. A way point is added to a way point array corresponding to the object based on the location data. Latitude and longitude steps are determined based on (a) the current marker position, (b) a first way point of the way point array, and (c) an adjustment factor. The current marker position is updated and the marker is rendered on the map at the updated current marker position in accordance with the frames per second rate for animating the movement of the marker on the map to smoothly animate the near-real time movement of the object.

15 Claims, 8 Drawing Sheets

(56) References Cited

OTHER PUBLICATIONS

Leeper, Bill, et al. (bloggers), "Openlayers 2—Interpolate Points Between Coordinates for Smooth Animation in Google Maps or Openmap", Geographic Information Systems Stack Exchange, Apr. 12, 2011, 2 pages, retrieved from <http://gis.stackexchange.com/questions/8424/interpolate-points-between-coordinates-for-smooth-animation-in-google-maps-or-op> on Mar. 6, 2017.

Oli (bloggers), "Google Maps—Moving Marker Smoothly Along Two GPS Coordinates", Geographic Information Systems Stack Exchange, Oct. 3, 2010, 2 pages, retrieved from <http://gis.stackexchange.com/questions/2357/moving-marker-smoothly-along-two-gps-coordinates> on Mar. 6, 2017.

Stack Overflow Community (bloggers), "Javascript Multiple Asyncronous setInterval", Geographic Information Systems Stack Exchange, Oct. 29, 2013, 3 pages, retrieved from <http://stackoverflow.com/questions/19665337/javascript-multiple-asyncronous-setinterval> on Mar. 6, 2017.

Von Staden, Rudi, et al. (bloggers), "Animation—How to Create an Animated Route Map (Á La Indiana Jones) in QGIS?", Geographic Information Systems Stack Exchange, May 2, 2016, 4 pages, retrieved from <http://gis.stackexchange.com/questions/191955/how-to-create-an-animated-route-map-%C3%A0-la-indiana-jones-in-qgis> on Mar. 6, 2017.

\* cited by examiner

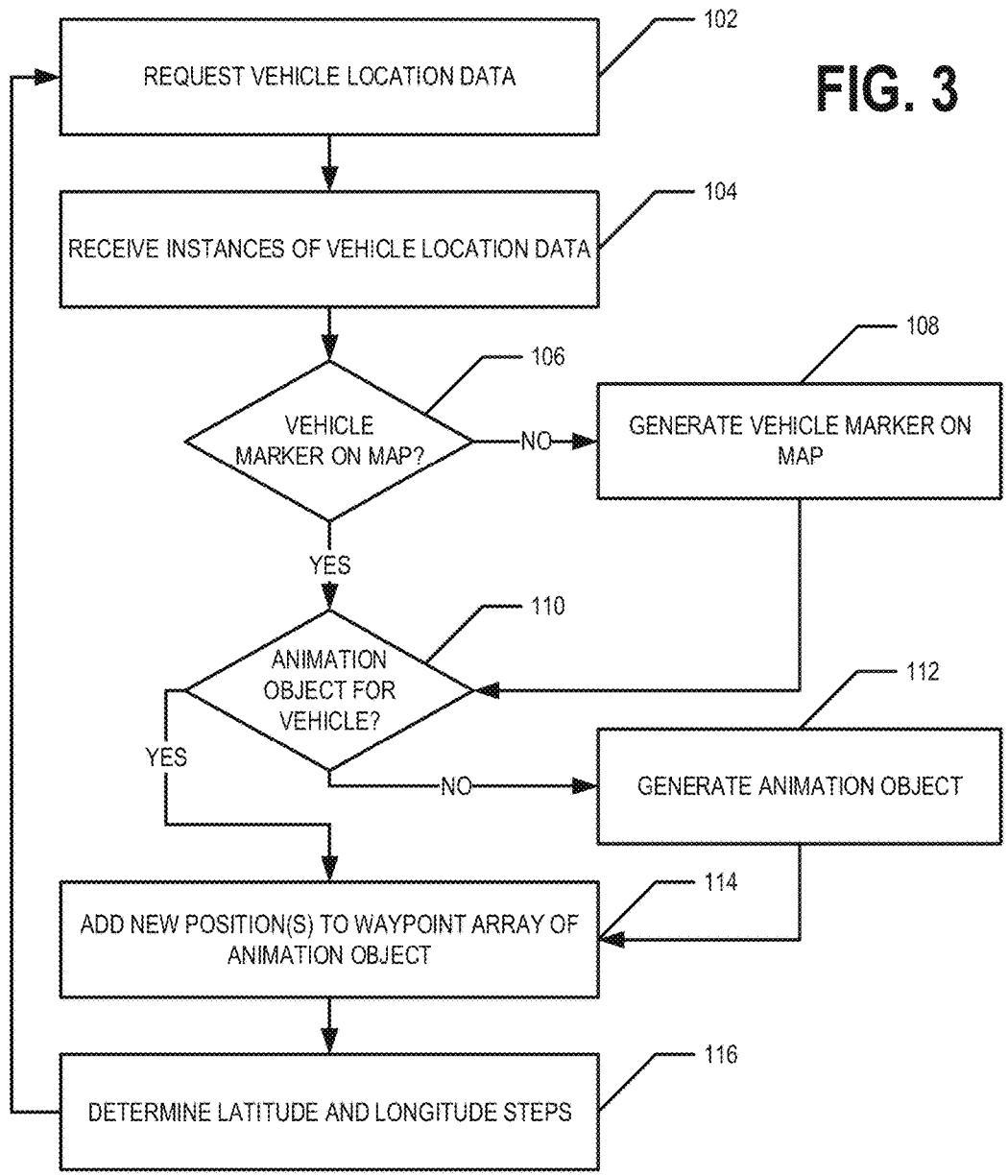

GRAPHICAL USER INTERFACE FOR SMOOTH ANIMATION RENDERING OF PROBE POINTS

TECHNOLOGICAL FIELD

An example embodiment relates generally to a graphical user interface that renders a smooth animation of vehicle probe points. An example embodiment relates generally to a graphical user interface that renders a smooth animation of vehicle probe points in real time and/or near real time while reducing the number of network calls required to provide the smooth animation.

BACKGROUND

When a user is waiting for a rideshare or public transportation vehicle to arrive at their location, the user may wish to view an animation showing the real time or near real time location of the rideshare vehicle. Similarly, a fleet manager managing a fleet of rideshare vehicles, delivery vehicles, emergency response vehicles, public transportation vehicles, and/or the like may wish to view an animation showing the real time or near real time location of the fleet vehicles. Generally, users prefer the animation of a vehicle's motion to be smooth. For example, users generally prefer that the vehicle marker move smoothly across the graphical user interface, rather than appearing to move across the graphical user interface in a series of jumps and pauses. However, a smooth animation generally requires a large set of high-frequency location data in order to mimic a smooth stream of timestamped vehicle positions. For example, a network request may be made every 100 milliseconds to a map matching system to obtain sufficient map-matched vehicle location data to provide a smooth, 10 frames per second (fps) animation. The number of network requests further increases if more than one vehicle is to be tracked by the animation. Thus, when using traditional methods, the number of network requests used to display a smooth animation is extremely high, which is costly in both bandwidth and mobile device battery life terms.

BRIEF SUMMARY OF EXAMPLE EMBODIMENTS

At least some example embodiments are directed to providing a smooth animation of the movement of a marker representing the position of a probe apparatus and/or corresponding object of interest along a map. For example, a smooth animation may be an animation in which the movement of the position of the marker does not appear to be a series of jumps and/or pauses. For example, the marker may represent the real time or near real time position of the probe apparatus and/or corresponding object of interest. In an example embodiment, the smooth animation is provided while requiring only a modest number and/or frequency of network and/or API requests. For example, a user apparatus may provide a network and/or API request to a network apparatus requesting location information/data corresponding to the probe apparatus and/or the corresponding object of interest at a modest frequency. For example, in an example embodiment, the user apparatus may provide a network and/or API request to the network apparatus at a slower rate than a request frequency required by a traditional smooth animation technique. In an example embodiment, the movement of a marker along a map displayed by a user interface of a user apparatus is determined based on latitude step or increment and a longitude step or increment at each position update. The latitude and longitude steps or increments may be determined based at least in part on one or more of the current marker position, a way point position determined based on location information/data corresponding to the probe apparatus and/or object of interest, the animation frames per second rate, the request rate at which the user apparatus requests location information/data from the network apparatus, and a marker speed factor. In an example embodiment, the movement of the vehicle marker may be determined such that the marker passes through one or more of the way points determined based on the location information/data corresponding to the probe apparatus and/or object of interest.

In an example embodiment, a map and a marker corresponding to an object of interest are displayed via a user interface of a user apparatus. The marker is displayed on the map at a current marker position. The user apparatus comprises a communication interface and a processor. Requested data is received by the user apparatus. The requested data comprises at least one instance of location data corresponding to the object of interest. The location data is generated at least in part by a probe apparatus corresponding to the object of interest. At least one way point is added to a way point array corresponding to the object of interest based on the at least one instance of location data. A latitude step and a longitude step are determined based on (a) the current marker position, (b) a first way point of the way point array, and (c) an adjustment factor. The current marker position is updated and the marker is rendered on the map at the updated current marker position in accordance with the frames per second rate for animating the movement of the marker on the map. The updating of the current marker position and the rendering the marker on the map at the updated current marker position comprises determining a new marker position based on the current marker position and the latitude and longitude steps, setting the current marker position to the new marker position, and rendering the marker at the new marker position via the user interface.

In accordance with an example embodiment, a method is provided that comprises displaying a map and a marker corresponding to an object of interest via a user interface of a user apparatus. The marker is displayed on the map at a current marker position. The user apparatus comprises a communication interface and a processor. The method further comprises receiving requested data by the user apparatus. The requested data comprises at least one instance of location data corresponding to the object of interest. The location data is generated at least in part by a probe apparatus corresponding to the object of interest. The method further comprises adding at least one way point to a way point array corresponding to the object of interest based on the at least one instance of location data; and determining a latitude step and a longitude step based on (a) the current marker position, (b) a first way point of the way point array, and (c) an adjustment factor. The method further comprises updating the current marker position and rendering the marker on the map at the updated current marker position in accordance with the frames per second rate for animating the movement of the marker on the map. Updating the current marker position and rendering the marker on the map at the updated current marker position comprises determining a new marker position based on the current marker position and the latitude and longitude steps, setting the current marker position to the new marker position, and rendering the marker at the new marker position via the user interface.

In an example embodiment, (a) the requested data is received in response to a request for location data and (b) the user apparatus requests requested data at a request rate. In an example embodiment, the adjustment factor is determined based on (a) a number of way points in the way point array, (b) the frames per second rate for animating the movement of the marker on the map, (c) a marker speed factor, and (d) the request rate. In an example embodiment, determining the new marker position comprises adding the latitude step to a latitude component of the current marker position and adding the longitude step to a longitude component of the current marker position. In an example embodiment, the adjustment factor is determined at least in part based on a number of way points in the way point array.

In an example embodiment, determining the new marker position comprises determining whether the linear distance between the new marker position and the first way point is greater than the linear distance between the current marker position and the first way point. In an example embodiment, in response to determining that the linear distance between the new marker position and the first way point is not greater than the linear distance between the current marker position and the first way point, the method further comprises setting the current marker position to the new marker position. In an example embodiment, in response to determining that the linear distance between the new marker position and the first way point is greater than the linear distance between the current marker position and the first way point, the method further comprises removing the first way point from the way point array, determining an updated latitude step and an updated longitude step based on (a) the current marker position, (b) a second way point of the way point array, and (c) the adjustment factor, determining the new marker position based on the current marker position and the updated latitude and longitude steps, and setting the current marker position to the new marker position.

In accordance with an example embodiment, an apparatus is provided that comprises a user interface, a communication interface, at least one processor, at least one memory storing computer program code, with the at least one memory and the computer program code configured to, with the processor, cause the apparatus to at least display a map and a marker corresponding to an object of interest via the user interface. The marker is displayed on the map at a current marker position. The at least one memory and the computer program code are further configured to, with the processor, cause the apparatus to at least receive requested data via the communication interface. The requested data comprises at least one instance of location data corresponding to the object of interest. The location data is generated at least in part by a probe apparatus corresponding to the object of interest. The at least one memory and the computer program code are further configured to, with the processor, cause the apparatus to at least add at least one way point to a way point array corresponding to the object of interest based on the at least one instance of location data; and determine a latitude step and a longitude step based on (a) the current marker position, (b) a first way point of the way point array, and (c) an adjustment factor. The at least one memory and the computer program code are further configured to, with the processor, cause the apparatus to at least update the current marker position and rendering the marker on the map at the updated current marker position in accordance with the frames per second rate for animating the movement of the marker on the map. Updating the current marker position and rendering the marker on the map at the updated current marker position comprises determining a new marker position based on the current marker position and the latitude and longitude steps, setting the current marker position to the new marker position, and rendering the marker at the new marker position via the user interface.

In an example embodiment, (a) the requested data is received in response to a request for location data and (b) the user apparatus requests requested data at a request rate. In an example embodiment, the adjustment factor is determined based on (a) a number of way points in the way point array, (b) the frames per second rate for animating the movement of the marker on the map, (c) a marker speed factor, and (d) the request rate. In an example embodiment, determining the new marker position comprises adding the latitude step to a latitude component of the current marker position and adding the longitude step to a longitude component of the current marker position. In an example embodiment, the adjustment factor is determined at least in part based on a number of way points in the way point array.

In an example embodiment, to determine the new marker position, the at least one memory and the computer program code are configured to, with the processor, cause the apparatus to at least determine whether the linear distance between the new marker position and the first way point is greater than the linear distance between the current marker position and the first way point. In an example embodiment, in response to determining that the linear distance between the new marker position and the first way point is not greater than the linear distance between the current marker position and the first way point, the at least one memory and the computer program code are configured to, with the processor, cause the apparatus to at least set the current marker position to the new marker position. In an example embodiment, in response to determining that the linear distance between the new marker position and the first way point is greater than the linear distance between the current marker position and the first way point, the at least one memory and the computer program code are configured to, with the processor, cause the apparatus to at least remove the first way point from the way point array, determine an updated latitude step and an updated longitude step based on (a) the current marker position, (b) a second way point of the way point array, and (c) the adjustment factor, determine the new marker position based on the current marker position and the updated latitude and longitude steps, and set the current marker position to the new marker position.

In accordance with an example embodiment, a computer program product is provided that comprises at least one non-transitory computer-readable storage medium having computer-executable program code instructions stored therein with the computer-executable program code instructions comprising program code instructions configured to display a map and a marker corresponding to an object of interest via a user interface of a user apparatus. The marker is displayed on the map at a current marker position. The user apparatus comprises a communication interface and a processor. The computer-executable program code instructions further comprise program code instructions configured to receive requested data at the user apparatus. The requested data comprises at least one instance of location data corresponding to the object of interest. The location data is generated at least in part by a probe apparatus corresponding to the object of interest. The computer-executable program code instructions further comprise program code instructions configured to add at least one way point to a way point array corresponding to the object of interest based on the at least one instance of location data; and determine a latitude step and a longitude step based on (a) the current marker position, (b) a first way point of the way point array, and (c) an adjustment factor. The computer-executable program code instructions further comprise program code instructions configured to update the current marker position and rendering the marker on the map at the updated current marker position in accordance with the frames per second rate for animating the movement of the marker on the map. Updating the current marker position and rendering the marker on the map at the updated current marker position comprises determining a new marker position based on the current marker position and the latitude and longitude steps, setting the current marker position to the new marker position, and rendering the marker at the new marker position via the user interface.

In an example embodiment, (a) the requested data is received in response to a request for location data and (b) the user apparatus requests requested data at a request rate. In an example embodiment, the adjustment factor is determined based on (a) a number of way points in the way point array, (b) the frames per second rate for animating the movement of the marker on the map, (c) a marker speed factor, and (d) the request rate. In an example embodiment, determining the new marker position comprises adding the latitude step to a latitude component of the current marker position and adding the longitude step to a longitude component of the current marker position. In an example embodiment, the adjustment factor is determined at least in part based on a number of way points in the way point array.

In an example embodiment, to determine the new marker position, the computer-executable program code instructions further comprise program code instructions configured to determine whether the linear distance between the new marker position and the first way point is greater than the linear distance between the current marker position and the first way point. In an example embodiment, in response to determining that the linear distance between the new marker position and the first way point is not greater than the linear distance between the current marker position and the first way point, computer-executable program code instructions further comprise program code instructions configured to set the current marker position to the new marker position. In an example embodiment, in response to determining that the linear distance between the new marker position and the first way point is greater than the linear distance between the current marker position and the first way point, computer-executable program code instructions further comprise program code instructions configured to remove the first way point from the way point array, determine an updated latitude step and an updated longitude step based on (a) the current marker position, (b) a second way point of the way point array, and (c) the adjustment factor, determine the new marker position based on the current marker position and the updated latitude and longitude steps, and set the current marker position to the new marker position.

In accordance with yet another example embodiment of the present invention, an apparatus is provided that comprises means for displaying a map and a marker corresponding to an object of interest. The marker is displayed on the map at a current marker position. The apparatus further comprises means for receiving requested data. The requested data comprises at least one instance of location data corresponding to the object of interest. The location data is generated at least in part by a probe apparatus corresponding to the object of interest. The apparatus further comprises means for adding at least one way point to a way point array corresponding to the object of interest based on the at least one instance of location data. The apparatus further comprises means for determining a latitude step and a longitude step based on (a) the current marker position, (b) a first way point of the way point array, and (c) an adjustment factor. The apparatus further comprises means for updating the current marker position and rendering the marker on the map at the updated current marker position in accordance with the frames per second rate for animating the movement of the marker on the map. Updating the current marker position and rendering the marker on the map at the updated current marker position comprises determining a new marker position based on the current marker position and the latitude and longitude steps, setting the current marker position to the new marker position, and rendering the marker at the new marker position via the user interface.

BRIEF DESCRIPTION OF THE DRAWINGS

Figure 1:
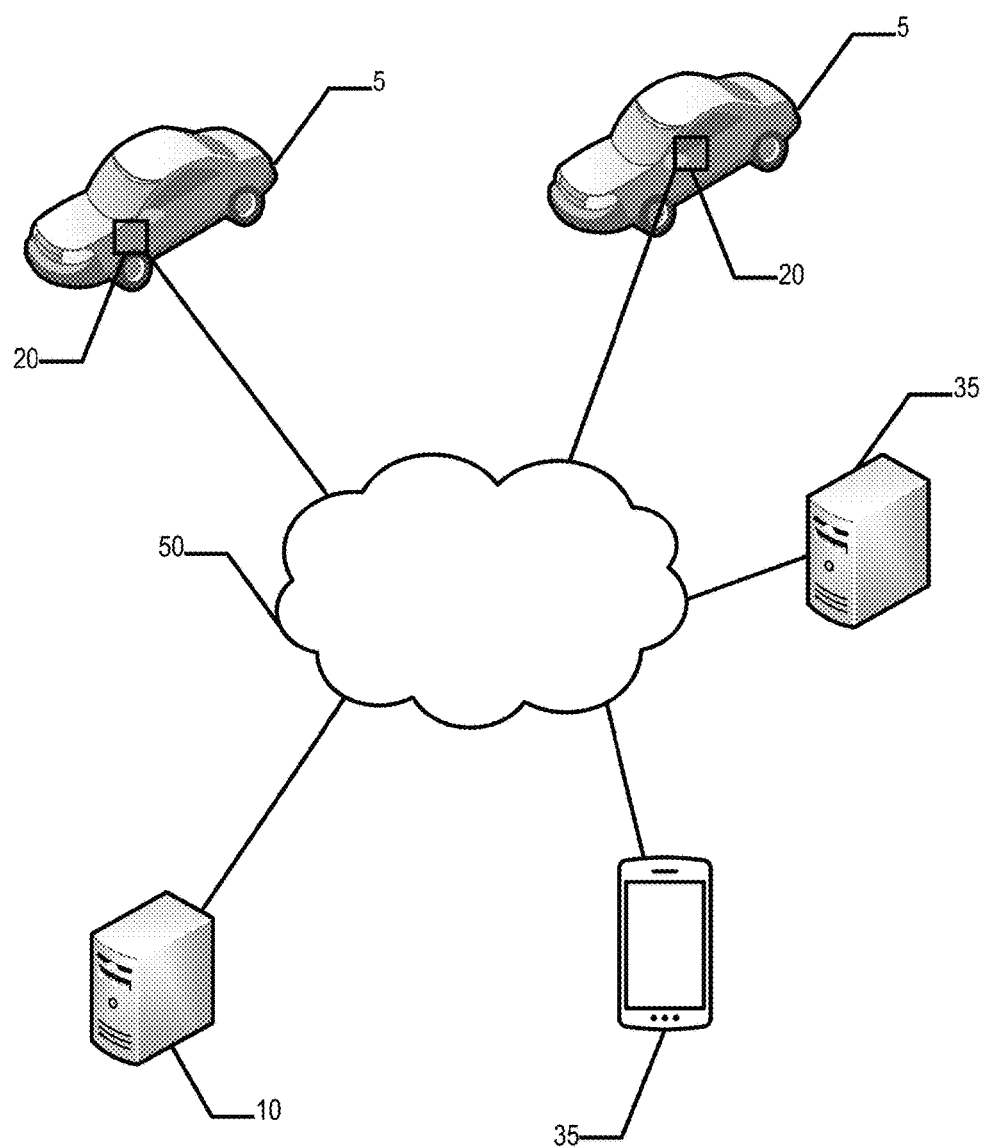
Figure 2A:
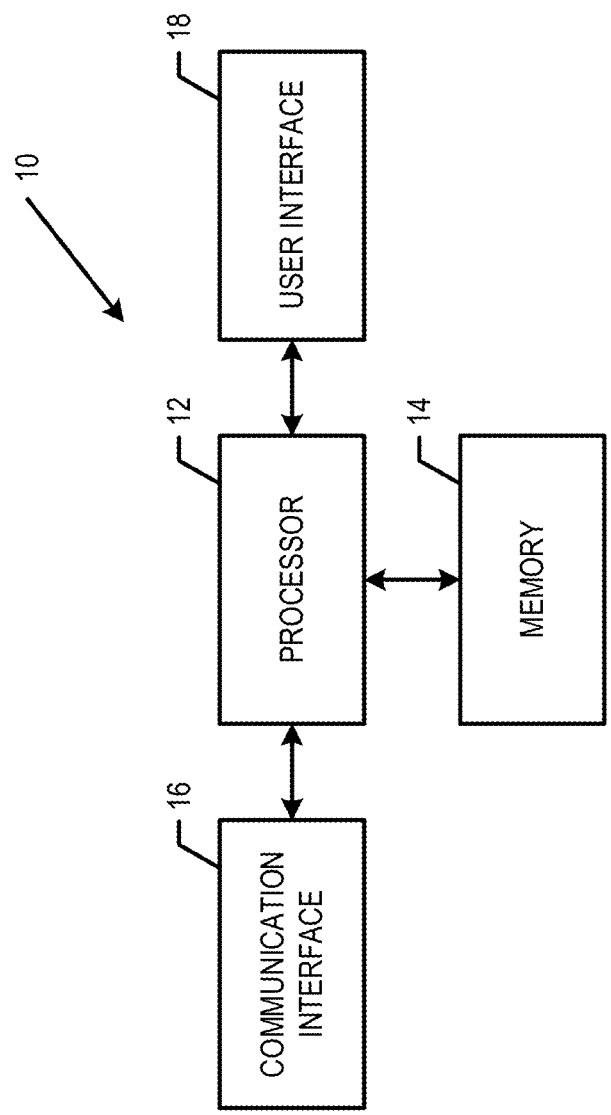
Figure 2B:
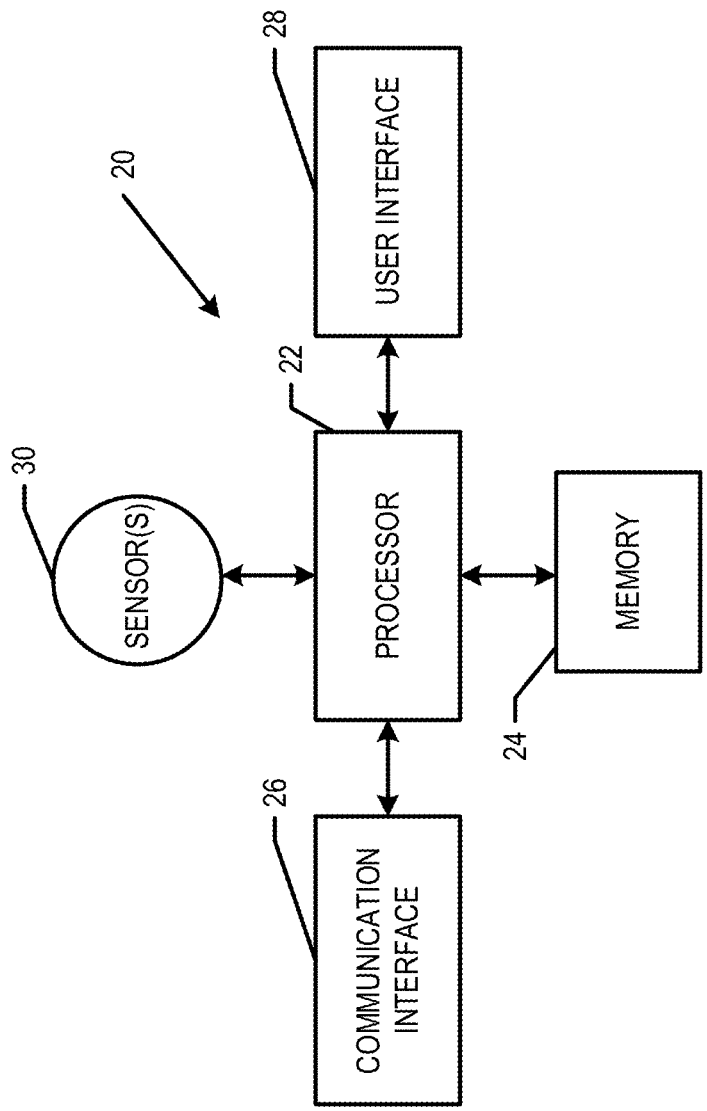
Figure 2C:
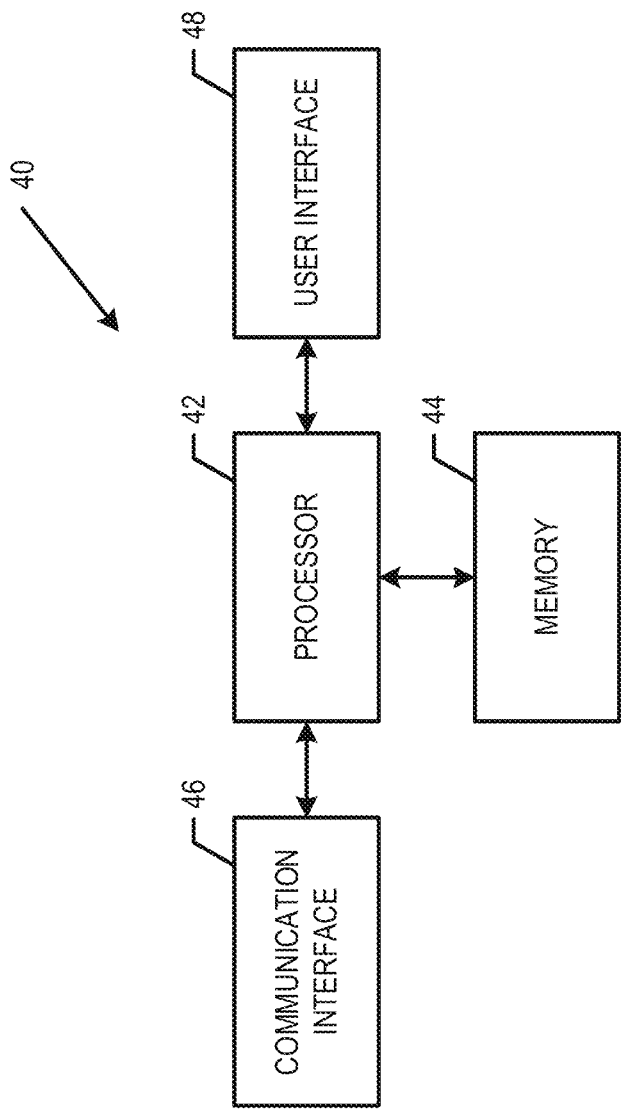
Figure 4:
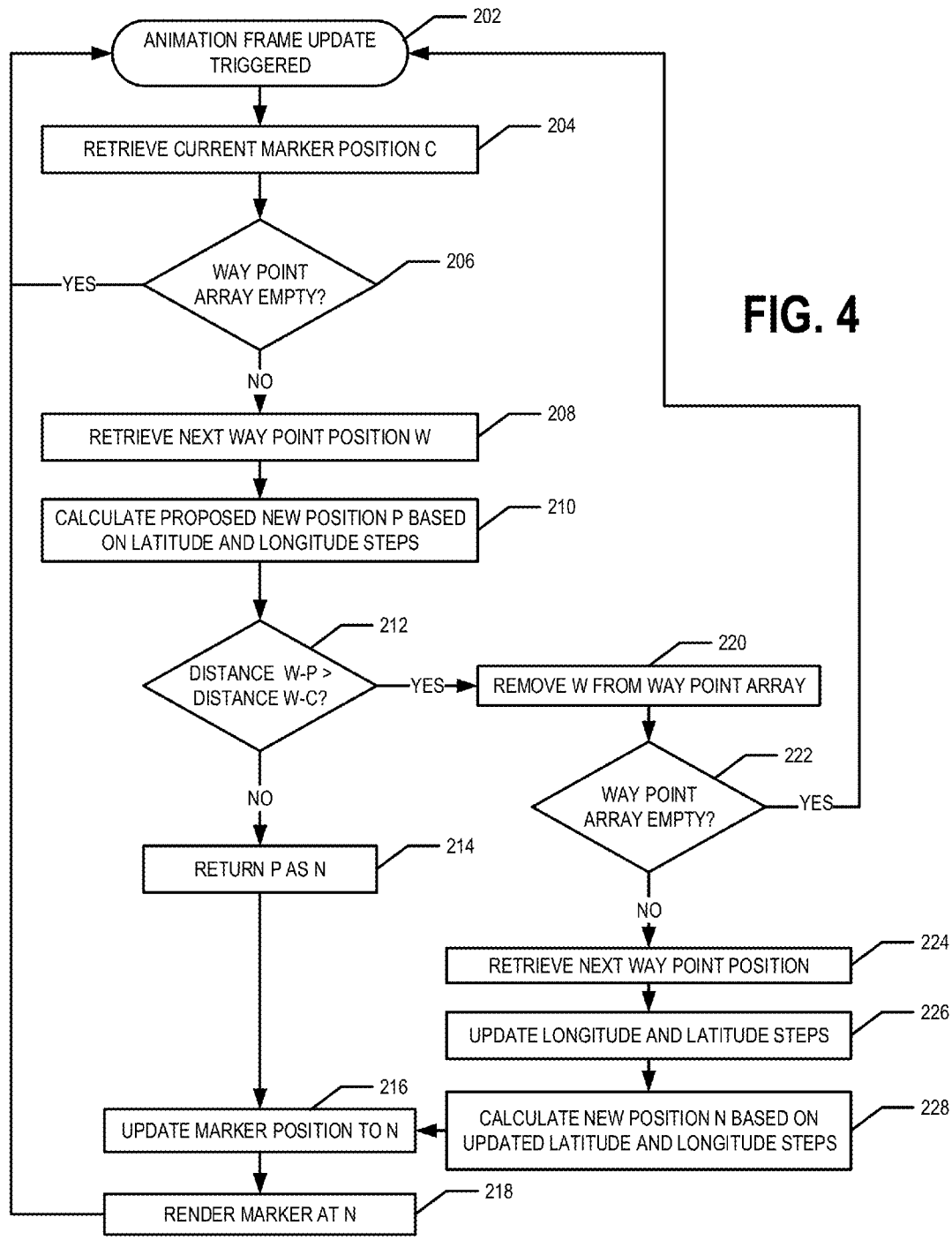

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a probe apparatus that may be specifically configured in accordance with an example embodiment;

FIG. 2C is a block diagram of a user apparatus that may be specifically configured in accordance with an example embodiment;

FIG. 3 is a flowchart illustrating operations performed, such as by the user apparatus of FIG. 2C to provide a smooth animation of the real time or near real time position of one or more vehicles, in accordance with an example embodiment;

FIG. 4 is a flowchart illustrating operations performed, such as by the user apparatus of FIG. 2C to update the animation of the real time or near real time position of one or more vehicles smoothly, in accordance with an example embodiment; and FIGS. 5A, 5B, 5C, 5D, and 5E provide schematic diagrams of updating an animation of a real time or near real time vehicle position, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. Like reference numerals refer to like elements throughout. As used herein, the terms "data," "content," "information," and similar terms may be used interchangeably to refer to data capable of being transmitted, received and/or stored in accordance with embodiments of the present invention.

Thus, use of any such terms should not be taken to limit the spirit and scope of embodiments of the present invention.

I. General Overview

Methods, apparatus, and computer program products are provided herein in accordance with an example embodiment in order to provide a smooth animation of a real time and/or near real time position of one or more vehicles. For example, example embodiments provide methods, apparatus, and computer program products for providing a smooth animation of a real time or near real time position of one or more vehicles that require a decreased number of network requests. For example, the animation may be provided and/or displayed to a user by a user interface of a user apparatus.

In an example embodiment, a plurality of instances of probe information/data may be generated by a probe apparatus onboard a vehicle. In an example embodiment, the vehicle may be a rideshare vehicle, a delivery vehicle, an emergency response vehicle, a public transportation vehicle and/or the like. In an example embodiment, an instance of probe information/data may comprise location information/data indicating the position of the probe apparatus and/or vehicle at the time the instance of probe information/data was captured. For example, the probe information/data may comprise a geophysical location (e.g., latitude and longitude) indicating the location and/or position of the probe apparatus at the time that the probe information/data is generated and/or provided (e.g., transmitted). In an example embodiment, the probe information/data may further comprise a probe identifier configured to uniquely identify the probe apparatus and/or corresponding vehicle, a capture time timestamp, and/or the like. The probe apparatus may then provide (e.g., transmit) one or more instances of probe information/data.

A network apparatus may receive probe information/data from a plurality of probe apparatuses. In an example embodiment, the network apparatus may be configured and/or programmed to determine traffic information/data based on at least a portion of the received probe information/data. In example embodiments, the network apparatus may store and/or provide the at least portions of the probe information/data provided by one or more of the plurality of probe apparatuses. For example, the network apparatus may be configured and/or programmed to provide (e.g., transmit) one or more instances of probe information/data and/or a portion thereof in response to receiving a network and/or application program interface (API) request. For example, the request may provide a probe identifier and a request for probe information/data and/or location information/data corresponding to the provided probe identifier.

A user apparatus may be configured and/or programmed to provide a graphical user interface, referred to herein as an animation interface, for displaying a smooth animation of a vehicle's position. The animation interface may be displayed by a user interface (e.g., screen, monitor, via projection, and/or the like) of the user apparatus. For example, the animation interface may display a map and a vehicle marker for each vehicle to be tracked by the animation. The user apparatus may provide (e.g., transmit) network and/or API requests at a predetermined request rate and receive one or more instances of probe information/data and/or a portion thereof. The instances of probe information/data and/or portion thereof may comprise real time and/or near real time location information/data for one or more vehicles. The animation interface displayed by the user interface of the user apparatus may animate the display of the position of one or more vehicles, as indicated based on the real time and/or near real time location information/data corresponding of the instances of probe information/data. While various embodiments are described herein with respect to providing a real time or near real time animation the position of one or more vehicles, it should be understood that various embodiments relate to non-real time and/or non-near real time applications.

FIG. 1 provides an illustration of an example system that can be used in conjunction with various embodiments of the present invention. As shown in FIG. 1, the system may include a plurality of probe apparatuses 20, one or more network apparatuses 10, one or more user apparatuses 40, one or more networks 50, and/or the like. In various embodiments, the plurality of probe apparatuses 20, one or more network apparatuses 10, and/or one or more user apparatuses 40 may communicate with one another and/or other computing entities via the one or more networks 50.

In various embodiments, the probe apparatus 20 may be an in vehicle navigation system, vehicle control system, a mobile computing device, and/or the like. For example, a probe apparatus 20 may be an in vehicle navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the probe apparatus 20 may be a smartphone, tablet, personal digital assistant (PDA), and/or other mobile computing device. In another example, the probe apparatus 20 may be a vehicle control system configured to autonomously drive a vehicle 5, assist in control of a vehicle 5, and/or the like. In example embodiments, a probe apparatus 20 is onboard a dedicated probe vehicle. In some embodiments, a probe apparatus 20 may be onboard, attached to, and/or carried by a moving object of interest. For example, the moving object of interest may be a personal vehicle, commercial vehicle, public transportation vehicle, emergency response vehicle, public service vehicle (e.g., postal delivery truck, garbage truck, and/or the like), airplane, taxi, ride-sharing vehicle, and/or other vehicle, a bicycle, an individual (e.g., the probe apparatus 20 may be attached to the race bib of an individual running a race), and/or another object of interest. For example, the probe apparatus 20 and the object of interest may be co-located (e.g., located at the same position). In an example embodiment, a probe apparatus 20 is any apparatus that provides (e.g., transmits) probe information/data to the network apparatus 10. In an example embodiment, a network apparatus 10 is a server, computing entity configured to operate in a Cloud-based computing environment, and/or the like. In an example embodiment, a user apparatus 40 is a smartphone, tablet, personal digital assistant (PDA), mobile computing device, desktop computer, and/or the like.

In an example embodiment, a network apparatus 10 may comprise components similar to those shown in the example network apparatus 10 diagrammed in FIG. 2A. In an example embodiment, the network apparatus 10 is configured and/or programmed to provide map updates, traffic information/data, and/or the like to the probe apparatus 20 and/or user apparatus 40; receive probe information/data from one or more probe apparatuses 20; provide instances of probe information/data and/or a portion thereof to one or more user apparatuses 40, and/or the like. In an example embodiment, the network apparatus 10 may be a server or other computing device. In an example embodiment, a probe apparatus 20 may comprise components similar to those shown in the example probe apparatus 20 diagrammed in FIG. 2B. In various embodiments, the network apparatus 10 may be located remotely from the probe apparatus 20. In various embodiments, a user apparatus 40 may comprise components similar to those shown in the example user apparatus 40 diagrammed in FIG. 2C.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20 may be in communication with a network apparatus 10 via the network 50. In another example, a user apparatus 40 may be in communication with a network apparatus 10 via the network 50. For example, the probe apparatus 20 may communicate with the network apparatus 10 via a network 50, such as the Cloud. For example, the Cloud may be a computer network that provides shared computer processing resources and data to computers and other devices connected thereto. For example, the probe apparatus 20 may be configured to receive one or more map tiles of a digital map from the network apparatus 10, traffic information/data (embedded in a map tile of a digital map or separate therefrom), and/or provide probe information/data to the apparatus 10.

In an example embodiment, as shown in FIG. 2B, the probe apparatus 20 may comprise a processor 22, memory 24, a communications interface 26, a user interface 28, one or more sensors 30 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; and/or other sensors that enable the probe apparatus 20 to determine one or more features of the corresponding vehicle's 5 surroundings), and/or other components configured to perform various operations, procedures, functions or the like described herein. In at least some example embodiments, the memory 24 is non-transitory.

Similarly, as shown in FIG. 2A, the apparatus 10 may comprise a processor 12, memory 14, a user interface 18, a communications interface 16, and/or other components configured to perform various operations, procedures, functions or the like described herein. In at least some example embodiments, the memory 14 is non-transitory.

As shown in FIG. 2C, the user apparatus 40 may comprise processor 42, memory 44, a user interface 48, a communications interface 46, and/or other components configured to perform various operations, procedures, functions or the like described herein. In at least some example embodiments, the memory 44 is non-transitory. For example, the user interface 48 of the user apparatus 40 may be configured and/or programmed to receive user input (e.g., indicating one or more vehicles to track via a smooth animation, and/or the like), display a map, display one or more vehicle markers on the map, animate the movement of the one or more vehicle markers to display the real time or near real time position of the corresponding vehicle, and/or the like. Certain example embodiments of the probe apparatus 20, the network apparatus 10, and the user apparatus 40 are described in more detail below with respect to FIGS. 2A, 2B, and 2C.

II. Example Operation

An example embodiment provides a smooth animation of the real time or near real time position of one or more objects of interest. In particular, the animation is smooth as an object marker configured to indicate the location of an object of interest appears to move smoothly rather than appearing to move through a series of jumps and/or pauses. An example embodiment provides the smooth animation while reducing the number of network requests compared to traditional techniques for providing a smooth animation of an object of interest's position. In the discussion below, the example objects of interest are vehicles. It should be understood, however, that teachings provided below relate to smoothly animating the real time or near real time position of a variety of objects of interest.

Generally, a probe apparatus 20 onboard a vehicle 5 may capture instances of probe information/data at a predetermined and/or configurable rate. In an example embodiment, an instance of probe information/data may comprise location information/data, a probe identifier, a capture time timestamp, and/or the like. The location information/data may be determined by a location sensor 30 (e.g., a GNSS sensor, GPS sensor, and/or the like) of the probe apparatus 20, in an example embodiment. In an example embodiment, the location information/data may be determined, derived, and/or the like based on detected electromagnetic signals (e.g., Wi-Fi, Bluetooth, Bluetooth Low Energy, cellular networks, RFID tags, and/or the like). In an example embodiment, the location information/data may correspond to a device emitting an electromagnetic signal and the electromagnetic signal being detected, perceived, and/or the like by a network of access points, signal receivers, and/or the like. For example, if the object of interest is an individual running a race, the probe apparatus 20 may be a beacon regularly and/or periodically emitting a signal (e.g., the probe apparatus 20 may be an active or passive RFID tag and/or the like). The signal from the probe apparatus 20 may detected by signal receivers located along the race course. The signal receivers may then provide the location information/data (and possibly a capture time timestamp and/or probe identifier corresponding to the runner, for example) to the network apparatus 10. For example, the location information/data may comprise a latitude and longitude or other geographical location indicating the position of the probe apparatus 20 and/or the vehicle 5 at the capture time. The probe identifier may be configured to uniquely identify the probe apparatus 20 that captured the probe information and/or the corresponding vehicle 5. The capture time timestamp may indicate an absolute time or relative time that the instance of probe information/data was captured. In various embodiments, an instance of probe information/data may comprise various other sensor information/data, routing information/data, and/or the like. The probe apparatus may provide (e.g., transmit) instances of probe information/data at a predetermined and/or configurable rate. For example, a probe apparatus 20 may comprise means, such as processor 22, communication interface 26, location sensor 30, and/or the like, for capturing instances of probe information/data and providing (e.g., transmitting) instances of probe information/data.

A network apparatus 10 may be configured to receive instances of probe information/data from one or more probe apparatuses 20. For example, the network apparatus may comprise means, such as processor 12, communications interface 16, and/or the like, for receiving instances of probe information/data from one or more probe apparatuses. In an example embodiment, the network apparatus 10 may be configured to analyze the received probe information/data to generate traffic information/data, perform one or more route determinations, provide one or more map tiles of a digital map to the probe apparatus 20, and/or the like. In an example embodiment, one or more instances of the probe information/data may be stored in a data structure. For example, the network apparatus 10 may store one or more instances of probe information/data in a data structure. For example, the network apparatus 10 may comprise means, such as the processor 12, memory 14, and/or the like, for storing one or more instances of probe information/data in a data structure. For example, in one embodiment, instances of probe information/data may be stored in a database using the probe identifier as a key, searchable and/or sortable data field, and/or the like. In an example embodiment, the location information/data may be filtered to correct for GNSS and/or other positioning errors. For example, the network apparatus 10 may perform a map-matching technique to match the location information/data of the probe information/data to a location on a road network. For example, the road location data may be known with high accuracy, and thus, if the probe apparatus 20 and/or vehicle 5 is expected to be traveling along a road segment of the road network, map-matching the location information/data may effectively filter out GNSS and/or other positioning errors. In an example embodiment, the filtered location information/data may be stored in the data structure in place of and/or in addition to the location information/data provided as part of the probe information/data.

A network apparatus 10 may receive a network and/or API call requesting one or more instances of probe information/data corresponding to one or more probe apparatuses 20 and/or vehicles 5. For example, a network apparatus 10 may comprise means for receiving a network and/or API call requesting one or more instances of probe information/data corresponding to one or more probe apparatuses 20 and/or vehicles 5. For example, the request may comprise one or more probe identifiers identifying the probe apparatuses and/or vehicles 5 for which probe information/data is being requested. In an example embodiment, the request may comprise an indication of one or more elements of an instance of probe information/data that is requested. For example, the request may indicate that only a capture time ordered list of location information/data is requested and/or that additional sensor information/data is not desired. In an example embodiment, the request is a request for the most recent instance of probe information/data. In an example embodiment, the request is a request for one or more and/or each instance of probe information/data with a capture time timestamp of a time indicated in the request or later. For example, the network and/or API request may comprise a request for the location information/data for each instance of probe information/data corresponding to probe identifier ABC123 with a capture time timestamp after 2:58:03 on the current date.

In response to receiving the network and/or API request, the network apparatus 10 may retrieve the requested instances of probe information/data and/or the requested portions of instances of probe information/data. For example, the network apparatus 10 may comprise means, such as the processor 12, memory 14, and/or the like, for retrieving the requested instances of probe information/data and/or the requested portions of the instances of probe information/data. For example, the requested instances of probe information/data and/or the requested portions of instances of probe information/data may be retrieved by querying the data structure storing the instances of probe information/data with a probe identifier provided by the request. The retrieved instances of probe information/data and/or portions thereof may be compiled to generate requested information/data. For example, the requested information/data may comprise at least one probe identifier and at least one instance of location information/data identified based on the network and/or API request. The network apparatus 10 may then provide (e.g., transmit) the requested information/data. For example, the network apparatus 10 may comprise means, such as the processor 12, communication interface 16, and/or the like for providing the requested information/data and/or portions of instances of probe information/data.

In an example embodiment, the network and/or API request is provided (e.g., transmitted) by a user apparatus 40. For example, the user apparatus 40 may receive user input and/or network input indicating and/or selecting one or more probe apparatuses 20 and/or vehicles 5 to be tracked via an animation interface displayed via the user interface 48. For example, the user apparatus 40 may comprise means, such as the processor 42, communications interface 46, user interface 48, and/or the like, for receiving user input and/or network input indicating and/or selecting one or more probe apparatuses 20 and/or vehicles 5 to be tracked via an animation interface displayed via the user interface 48. In response to receiving the user and/or network input, the user apparatus 40 may generate and provide a network and/or API request to request one or more instances of probe information/data and/or portions of one or more instances of probe information/data from the network apparatus 10. As described above the network and/or API request may comprise at least one probe identifier corresponding to a probe apparatus 20 and/or vehicle 5 to be tracked via the animation interface, information/data requested (e.g., what type of information/data, a capture time associated with the information/data, and/or the like), and/or the like. The user apparatus 40 may continue provide a network and/or API request at a predetermined and/or configurable request rate until the animation interface is closed, the animation is turned off, and/or the like. In an example embodiment, the request rate may be slower and/or significantly slower than the frames per second rate of the animation. For example, in one embodiment, the frames second rate of the animation is 10 frames per second and the request rate is once per second.

The user apparatus 40 may receive the requested information/data corresponding to the provided network and/or API request. For example, the user apparatus 40 may receive the requested information/data. In response to receiving the requested information/data that was provided by the network apparatus 10 in response to the, for example, first network and/or API request, the user apparatus 40 may determine a relevant area of a map for display via the animation interface. For example, based on one or more instances of location/data of the requested information/data, a relevant area of a map for display via the animation interface may be determined. For example, the user apparatus 40 may comprise means, such as the processor 42 and/or the like, for determining a relevant area of a map for display via the animation interface. For example, in one embodiment, a relevant area of a map may include a predetermined and/or configurable radius about a first location for each probe apparatus 20 and/or vehicle 5 to be tracked via the animation interface. For example, the predetermined and/or configurable radius may be a quarter of a mile, half a mile, one mile, two miles, five miles, ten miles, half a kilometer, a kilometer, two kilometers, five kilometers, ten kilometers, 15 kilometers, and/or the like, as appropriate for the application. In an example embodiment, the relevant area of the map includes the position of at least one probe apparatus 20 and/or vehicle 5 as indicated in the requested information/data. Various techniques for identifying the relevant area of the map may be used in various embodiments, as appropriate of the application.

After determining the relevant area of the map, map information/data corresponding to the relevant area of the map is retrieved. For example, the user apparatus 40 may retrieve map information/data corresponding to the relevant area of the map from, for example, a map database. For example, the user apparatus 40 may comprise means, such as the processor 42, memory 44, and/or the like for retrieving map information/data corresponding to the relevant area of the map. The relevant area of the map may then be displayed via the animation interface via user interface 48. For example, the user apparatus 40 may display the relevant area of the map, based on the retrieved map information/data, via the animation interface. For example the user apparatus 40 may comprise means, such as the processor 42, user interface 48, and/or the like, for displaying the relevant area of the map, based on the retrieved map information/data, via the animation interface. A vehicle marker indicating the position of one or more probe apparatuses 20 and/or vehicles 5 may be displayed on the map via the animation interface. The location of the vehicle marker on the map may indicate the position of the corresponding probe apparatus 20 and/or vehicle 5 based on the corresponding location information/data from the requested information/data. In an example embodiment, a planned and/or expected route, a previously traveled route, an expected time of arrival or expected time until arrival at a destination, and/or the like for a probe apparatus 20 and/or vehicle 5, may also be displayed via the animation interface in various embodiments. Movement of the vehicle marker across the map may then be smoothly animated using an interpolation process described in more detail below with respect to FIGS. 3, 4, 5A, 5B, 5C, 5D, and 5E. In an example embodiment, the relevant area of the map may be redetermined based upon receipt and/or processing of each set of requested information/data. In an example embodiment, the relevant area of the map may be redetermined if one or more vehicle markers reach a threshold distance within the edge of the currently displayed relevant area of the map. In various embodiments, the redetermination of the relevant area of the map and the adjustment of the displayed portion of the map may be completed through various techniques, as appropriate for the application.

Smoothly Animating Movement of a Vehicle

FIG. 3 provides a flowchart illustrating operations performed, for example by the user apparatus 40, to provide a smooth animation of the real time or near real time position of one or more probe apparatuses 20 and/or vehicles 5. For example, the user apparatus 40 may receive the user and/or network input indicating that the user apparatus 40 should provide an animation interface for displaying the real time or near real time position of a probe apparatus 20 and/or vehicle 5, identify and/or determine a relevant portion of a map, and display the map via the animation interface of the user interface 48. At block 102, a network and/or API request may be provided. For example, the user apparatus 40 may provide (e.g., transmit) a network and/or API request. For example, the user apparatus 40 may comprise means, such as the processor 42, communication interface 46, and/or the like, for providing a network and/or API request. The user apparatus 40 may be configured and/or programmed to generate and provide a network and/or API request in accordance with a predetermined and/or configurable request rate. In an example embodiment, the request rate is slower than and/or significantly slower than the frames per second rate of the animation. For example, in one embodiment, the frames per second rate of the animation is 10 frames per second and the request rate is once per second.

The request is provided to the network apparatus 10, such that the network apparatus 10 receives the request via the communications interface 16 thereof, in an example embodiment. For example, the network and/or API request may comprise one or more probe identifiers identifying the probe apparatuses 20 and/or vehicles 5 for which probe information/data and/or location information/data is being requested. In an example embodiment, the request may comprise an indication of one or more elements of an instance of probe information/data that is requested (e.g., the location information/data, and/or other sensor information/data). For example, the request may indicate that only a capture time ordered list of location information/data is requested and/or that additional sensor information/data is not desired. In an example embodiment, the request is a request for the most recent instance of probe information/data. In an example embodiment, the request is a request for one or more and/or each instance of probe information/data with a capture time timestamp that indicates a capture time that occurred after a time indicated in the request. For example, the network and/or API request may comprise a request for the location information/data for each instance of probe information/data corresponding to probe identifier ABC123 with a capture time timestamp after 2:58:03 on the current date.

In response to receiving the network and/or API request, the network apparatus 10 may retrieve the requested instances of probe information/data and/or the requested portions of instances of probe information/data. For example, the network apparatus 10 may comprise means, such as the processor 12, memory 14, and/or the like, for retrieving the requested instances of probe information/data and/or the requested portions of the instances of probe information/data. For example, the requested instances of probe information/data and/or the requested portions of instances of probe information/data may be retrieved by querying the data structure storing the instances of probe information/data with a probe identifier provided by the request. The retrieved instances of probe information/data and/or portions thereof may be compiled to generate requested information/data. For example, the requested information/data may comprise at least one probe identifier and at least one instance of location information/data identified based on the network and/or API request. The network apparatus 10 may then provide (e.g., transmit) the requested information/data. For example, the network apparatus 10 may comprise means, such as the processor 12, communication interface 16, and/or the like for providing the requested information/data and/or portions of instances of probe information/data. In an example embodiment, the requested information/data may comprise the raw location information/data provided as part of the probe information/data. In one embodiment, the requested information/data may comprise map-matched location information/data wherein the raw location information/data of the probe information/data has been used to map-match the probe apparatus 20 and/or vehicle 5 to a link of a digital map corresponding to the road segment the vehicle 5 is traveling along.

At block 104, the requested information/data is received. For example, the user apparatus 40 may receive the requested information/data. For example, the user apparatus 40 may comprise means, such as the processor 42, communication interface 46, and/or the like for receiving the requested information/data. The user apparatus 40 may then process the received requested information/data and use the received requested information/data to update the position of one or more vehicle markers on the animation interface using a smooth animation technique. As noted above, the position of one or more vehicles may be displayed on the animation interface by providing a vehicle marker for each of the one or more vehicles. Thus, in an example embodiment, the received requested information/data may comprise one or more instances of location information/data for one or more probe apparatuses 20 and/or vehicles 5 and/or associated with one or more probe identifiers. The position of each of the vehicle markers on the animation interface may be updated using a smooth animation technique described below.

At block 106, it is determined if a vehicle marker corresponding to a probe apparatus 20 and/or vehicle 5 is currently being displayed on the animation interface. For example, the received requested information/data may include one or more instances of location information/data associated with and/or indexed by a probe identifier. For each probe identifier of the received requested information/data, the user apparatus 40 may determine if a vehicle marker corresponding thereto is currently being displayed on the animation interface. For example, the user apparatus 40 may comprise means, such as the processor 42 and/or the like, for determining if a vehicle marker corresponding to each probe identifier of the received requested information is currently being displayed on the animation interface.

If at block 106, it is determined that a probe identifier of the received requested information/data does not correspond to any of the vehicle markers currently being displayed on the animation interface, the process continues to block 108. For example, if a vehicle marker corresponding to a probe identifier of the received requested information/data is not currently being displayed via the animation interface, a vehicle marker is generated on the animation interface. The vehicle marker corresponding to a probe identifier may be positioned on the map displayed by the animation interface in a position corresponding to an instance of location information/data associated with the probe identifier. For example, the vehicle marker may be generated at a position on the map corresponding to the instance of location information/data corresponding to and/or indexed by the probe identifier that is associated with the earliest capture time timestamp. For example, the user apparatus 40 may generate a vehicle marker on the map displayed via the animation interface. For example, the user apparatus 40 may comprise means, such as processor 42, user interface 48, and/or the like, for generating a vehicle marker on the map displayed via the animation interface. In an example embodiment, generating the vehicle marker comprises rendering the vehicle marker.

As should be understood, in an example embodiment a vehicle marker may not be displayed for each probe identifier of the received requested information/data. For example, a user may provide user input indicating that a vehicle marker for one or more of the probe identifiers of the received requested information/data. In such an instance, the user apparatus 40 may perform one or more of the processes, procedures, and/or operations for smoothly animating the position of the corresponding probe apparatus 20 and/or vehicle 5 (e.g., update one or more elements of a corresponding animation object) but may not display the corresponding vehicle marker on the animation interface or the user apparatus 40 may not update a corresponding animation object.

If, at block 106, it is determined that a vehicle marker for each probe identifier of the received requested information/data is currently being displayed via the animation interface and/or after generating one or more vehicle markers, the process continues to block 110. At block 110, it is determined if an animation object exists for each probe identifier of the received requested information/data. For example, an animation object may be stored as a part of a map that the relevant portion thereof is being displayed via the animation interface. For example, an animation object corresponding and/or comprising a probe identifier may be stored as part of the map from which the relevant area is being displayed by the animation interface. In an example embodiment, an animation object is a data structure comprising a way point array, a current position, a latitude step, a longitude step, a probe identifier, and/or the like. In an example embodiment, the way point array is capable of storing one or more way points in an ordered arrangement. For example, a way point may be a position of a probe apparatus 20 and/or vehicle 5 as defined by a latitude and longitude pair, and/or the like. For each probe identifier of the received requested information/data, the user apparatus 40 may determine if an animation object corresponding thereto is exists. For example, the user apparatus 40 may comprise means, such as the processor 42, memory 44, and/or the like, for determining if an animation object corresponding to each probe identifier of the received requested information exists (e.g., is stored in the memory 44).

If, at block 110, it is determined that a probe identifier of the received requested information/data does not correspond to any of the existing animation objects (e.g., stored in the memory 44), the process continues to block 112. For example, if an animation object corresponding to a probe identifier of the received requested information/data is does not exist (e.g., cannot be located and/or identified in memory 44), an animation object is generated corresponding to the probe identifier. For example, an animation object comprising the probe identifier may be generated and/or stored (e.g., in memory 44). For example, the user apparatus 40 may generate an animation object corresponding to the probe identifier. For example, the user apparatus 40 may comprise means, such as processor 42, memory 44, and/or the like, for generating and/or storing an animation object (e.g., in the memory 44). For a generated animation object, the corresponding vehicle marker may be displayed on the map at a position corresponding to the instance of location information/data of the received requested information/data corresponding to the probe identifier having the earliest capture time timestamp.

If, at block 110, it is determined that an animation object for each probe identifier of the received requested information/data exists and/or after generating one or more animation objects, the process continues to block 114. At block 114, the instances of location information/data associated with a first probe identifier are used to determine one or more way points for the first probe apparatus 20 and/or first vehicle 5 identified by the first probe identifier. If the way point array of the animation object corresponding to and/or comprising the probe identifier is empty (e.g., does not currently contain any way points), the one or more instances of location information/data are added as way points of the way point array, wherein each unique instance of location information/data is added as a way point. If the way point array of the animation object corresponding to and/or comprising the probe identifier is not empty (e.g., does currently contain one or more way points), the one or more instances of location information/data that indicate positions different from the way point(s) of the way point array are added to the way point array as way points. In an example embodiment, the way point array only comprises unique way points. Thus, the way point array does not comprise any two way points that correspond to the same location. For example, the way point array may only comprise one instance of any particular latitude and longitude pair. Thus, the one or more instances of location information/data of the received requested information/data and corresponding to the first probe identifier may be added as way points to the way point array of the animation object corresponding to and/or comprising the first probe identifier. For example, the user apparatus 40 may add one or more way points to the way point array of the animation object corresponding to and/or comprising the first probe identifier based on one or more instances of location information/data of the received requested information/data and corresponding to the first probe identifier. For example, the user apparatus 40 may comprise means, such as the processor 42 and/or the like, for adding one or more way points to the way point array of the animation object corresponding to and/or comprising the first probe identifier based on one or more instances of location information/data of the received requested information/data and corresponding to the first probe identifier. In an example embodiment, the way point array may be time ordered such that the way points therein are organized based on the capture time timestamp corresponding to the instances of location information/data used to generate the way points. For example, if a way point array comprises two way points (e.g., W1, W2), the way point array may ordered such that first way point W1 is before the second way point W2. Way points may be added to one or more way point arrays in a similar manner, wherein each way point array corresponds to an animation object corresponding to and/or comprising a probe identifier that corresponds to at least one instance of location information/data of the received requested information/data.

At block 116, a latitude step or increment and a longitude step or increment is determined, calculated, and/or the like for each animation object. For example, the user apparatus 40 may determine, calculate, and/or the like a latitude step or increment and a longitude step or increment for each animation object. For example, the user apparatus 40 may comprise means, such as the processor 42 and/or the like, for determining, calculating, and/or the like a latitude step or increment and a longitude step or increment for each animation object. In an example embodiment, the latitude step or increment and the longitude step or increment are determined, calculated, and/or the like based on the current position of the vehicle marker, the first way point of the way point array of the animation object, and a frames per second rate for animating movement of the marker on the map.

In an example embodiment, the latitude step or increment and the longitude step or increment are determined, calculated, and/or the like based on the current position of the vehicle marker, the first way point of the way point array of the animation object, a frames per second rate for animating movement of the marker on the map, and a marker speed factor. For example, the latitude step or increment d(lat) may be determined, calculated, and/or the like by determining the change in latitude $\Delta(lat)$ between the current marker position and the latitude of the first way point and multiplying the change in latitude by an adjustment factor $f_{adj}$. For example, $d(lat)=\Delta(lat)*f_{adj}$. In an example embodiment, the adjustment factor is determined based on the frames per second rate $R_{fps}$, the marker speed factor $f_{ms}$, $f_{ms}'$, and/or the like. For example, in one embodiment $$f_{adj} = \begin{cases} (\text{size(way point array)} - 1) * f_{ms} / R_{fps} & \text{size(way point array)} > 1 \\ f_{ms}' / R_{fps}, & \text{otherwise} \end{cases},$$

wherein $f_{ms}=R/(Q*S)$, wherein $1<R<2$, $Q>1$, and S is the reciprocal of the request rate (e.g., the rate at which the user apparatus 40 provides the network and/or API requests) and $f_{ms}'=1/(Q*S)$. In an example embodiment, the request rate 1/S is measured in Hertz. The longitude step or increment d(long) may be determined, calculated, and/or the like in a similar manner. Thus, in an example embodiment, the latitude and longitude steps or increments may be determined and/or calculated based on the change in position between the current marker position of the vehicle marker and the first way point, the frames per second rate $R_{fps}$, the marker speed factor $f_{ms}$, $f_{ms}'$. In an example embodiment, the frames per second rate $R_{fps}=10$ Hz and the request rate 1/S=1 Hz. In various embodiments, the frames per second rate $R_{fps}$ may vary from, for example, 60 Hz to 2 Hz and the request rate 1/S may vary from, for example, 10 Hz to 0.1 Hz. In various embodiments, the request rate 1/S is slower or substantially slower than the frames per second rate $R_{fps}$. In an example embodiment, the marker speed factor $f_{ms}$, $f_{ms}'$ may be configured to adjust the speed at which the vehicle marker is moved across the animation interface. For example, if the way point array includes a large number of way points, it is desired to increase the speed at which the vehicle marker moves across the animation interface such that the position of the vehicle marker on the animation interface better reflects the real time or near real time position of the corresponding probe apparatus 20 and/or vehicle 5. The marker speed factor may further be configured to prevent the vehicle marker from reaching the last way point in the way point array and then pausing while the user apparatus requests, receives, and/or processes new requested information/data. Thus, the marker speed factor is configured to provide smooth animation (e.g., an animation that does not regularly jump and pause) of the vehicle marker along the map displayed via the animation interface to provide a good representation of a probe apparatus 20 and/or vehicle's real time and/or near real time position. Moreover, the marker speed factor allows for smooth animation of the vehicle marker along a map displayed by the animation interface while reducing the number of network and/or API requests need to ensure the smooth animation.

The process may then return to block 102 vehicle location information/data may be requested from the network apparatus 10 in accordance with the request rate 1/S.

Generally for animation of the position of a vehicle marker along a map to be displayed to a user in a smooth manner, the request rate 1/S, the frequency or rate at which the user apparatus provides network and/or API requests to the network apparatus, is not significantly slower than the animation frames per second rate $R_{fps}$. For example, prior art techniques for animating movement of the position of a vehicle marker along a map require a large volume of network and/or API requests. However, such techniques are costly in both bandwidth and battery life terms for the user apparatus. Animations of the position of a vehicle marker along a map in which the request rate 1/S is slower or substantially slower than the animation frames per second rate $R_{fps}$, are generally not smooth and are characterized by jumps and pauses of the vehicle marker. Thus, various example embodiments provide an improvement to the computer-related technology of displaying a smooth animation of the position of a vehicle marker along a map displayed to a user through an animation interface via a user interface of a user apparatus. In particular, the smooth animation shows the near real time position of the vehicle with respect to the map displayed via the animation interface such that the vehicle marker representing the near real time position of the vehicle moves smoothly along the map, according to various example embodiments. Moreover, in various example embodiments, the request rate 1/S is slower or substantially slower than the animation frames per second rate $R_{fps}$. Thus, an example embodiment provides a smooth animation of a vehicle marker along a map displayed by the animation interface via the user interface of a user apparatus while greatly reducing the number of network and/or API requests provided to the network apparatus by the user apparatus required to provide the smooth animation.

Updating a Smooth Animation of the Movement of a Vehicle

As described above, animating the position of a vehicle marker along a map displayed by the animation interface to represent the movement of a user apparatus 20 and/or vehicle 5 may be accomplished by updating the current position of the vehicle marker based on latitude and longitude steps or increments configured to interpolate between a previous way point and a next way point. The previous way point indicates a previous position of a probe apparatus 20 and/or vehicle 5 and the next way point may indicate a real time or near real time position of a probe apparatus 20 and/or vehicle 5, as indicated by the location information/data of the received requested information/data and corresponding to the probe apparatus 20 and/or vehicle 5. In an example embodiment, the position of the vehicle marker is updated based on the latitude and longitude steps or increments d(lat) and d(long) at the animation frames per second rate $R_{fps}$. For example, the position of the vehicle marker may be updated to a position that is equal to the latitude of the current position plus the latitude step or increment and the longitude of the current position plus the longitude step or increment. For example, the latitude of the new position N(lat) may be the latitude of the current position C(lat) plus the latitude step or increment d(lat) or N(lat)=C(lat)+d(lat). The longitude of the new position may be similarly determined based on the longitude of the current position and the longitude step or increment. Once the new position is determined, the current marker position of the animation object corresponding to the probe apparatus 20 and/or vehicle 5 may be set to the new position and the vehicle marker may be rendered and/or displayed at the new position. This process of updating the current marker position and moving the vehicle marker may be repeated in accordance with the animation frames per second rate $R_{fps}$. A detailed description of animating the position of the vehicle marker along the amp of the animation interface displayed by the user interface 48 is described below with respect to FIGS. 4, 5A, 5B, 5C, 5D, and 5E.

Starting at block 202 of FIG. 4, an animation frame update is triggered. For example, an animation frame update may be triggered in accordance with the animation frame per second rate. For example, the user apparatus 40 may determine that an amount of time determined based on the animation frame per second rate has passed since the immediately preceding animation frame update was triggered and, in response thereto, trigger an animation frame update. For example, the user apparatus 40 may comprise means, such as the processor 42 and/or the like, for determining that an amount of time determined based on the animation frame per second rate has passed since the immediately preceding animation frame update was triggered and, in response thereto, trigger an animation frame update.

At block 204, the current marker position C is retrieved. For example, the current marker position C corresponding to a probe identifier, probe apparatus 20, and/or vehicle 5 may be retrieved from the corresponding animation object. For example, the corresponding animation object may comprise the probe identifier. For example, the user apparatus 40 may retrieve the current marker position C from the corresponding animation object. For example, the user apparatus 40 may comprise means, such as the processor 42, memory 44, and/or the like, for retrieving the current marker position C from the corresponding animation object. The current marker position C is characterized by a latitude component C(lat) and a longitude component C(long).

At block 206, it is determined if the way point array is empty. For example, if there are no way points in the way point array of the corresponding animation object, then no new way points and/or instances of location information/data have been received since the vehicle marker reached the position of the previous way point. In an example embodiment, this may mean that the probe apparatus 20 and/or vehicle 5 has stopped, and thus the recent location information/data does not indicate a position that is different from the current marker position. In another instance of an example embodiment, this may mean that the communication between either the probe apparatus 20 and the network apparatus 10 and/or the network apparatus 10 and the user apparatus 40 has been disrupted. For example, the user apparatus 40 may determine if the way point array is empty. For example, the user apparatus 40 may comprise means, such as the processor 42, memory 44, and/or the like, for determining if the way point array is empty.

If it is determined, at block 206, that the way point array is empty, the process may return to block 202 to wait for the triggering of the next animation frame update. If it is determined, at block 206, that the way point array is not empty, the process continues to block 208. At block 208, the position of the next way point W is retrieved. For example, the user apparatus 40 may retrieve the position of the next way point W. For example, the user apparatus 40 may comprise means, such as the processor 42, memory 44, and/or the like for retrieving the position of the next way point W. For example, the next way point W may be the way point in the way point array associated with the earliest capture time timestamp. For example, the position of the next way point W may be retrieved from the way point array from the corresponding animation object.

At block 210, a proposed new position P is determined, calculated, and/or the like based on the current position C and the latitude and longitude steps or increments d(lat) and d(long). Similar to the current position C, the proposed new position P is characterized by a latitude component P(lat) and a longitude component P(long). For example, the latitude component of the new position P(lat) may be determined, calculated, and/or the like by adding the latitude step or increment d(lat) to the latitude component of the current position C(lat), or P(lat)=C(lat)+d(lat). The longitude component of the new positioning P(long) may be determined, calculated, and/or the like in a similar manner. Thus, the user apparatus 40 may determine, calculate, and/or the like the proposed new position P. For example, the user apparatus 40 may comprise means, such as the processor 42 and/or the like, for determining, calculating, and/or the like the proposed new position P.

At block 212, it is determined if the linear distance between the way point W and the proposed new position P is greater than the linear distance between the current position C and the way point W. A way point W may be characterized by a latitude component W(lat) and longitude component W(long). For example, the user apparatus 40 may determine if the linear distance between the way point W and the proposed new position P is greater than the linear distance between the current position C and the way point W. For example, the user apparatus 40 may comprise means, such as the processor 42 and/or the like, for determining if the linear distance between the way point W and the proposed new position P is greater than the linear distance between the current position C and the way point W. For example, the linear distance between the way point W and the new proposed position may be calculated as $$\sqrt{((W(lat) - P(lat))^2 + (W(long) - P(long))^2)}$$

and the linear distance between the current position C and the way point W may be calculated as $$\sqrt{((C(lat) - W(lat))^2 + (C(long) - W(long))^2)},$$

in an example embodiment. If it is determined that the linear distance from the way point W to the proposed new position P is greater than the linear distance between the current position C and the way point W, it is determined that the vehicle marker has reached the way point W. If it is determined that the linear distance from the way point W to the proposed new position P is not greater than the linear distance between the current position C and the way point W, it is determined that the vehicle marker has not yet reached the way point W.

If, at block 212, it is determined that the vehicle marker has not yet reached the way point W, the process continues to block 214. At block 214, the proposed new position P is returned as the new position N. For example, the user apparatus 40 may return the proposed new position P as the new position N. For example, the user apparatus 40 may comprise means, such as the processor 42 and/or the like, for returning the new proposed new position P as the new position N.

At block 216, the position of the vehicle marker, as displayed by the animation interface, is update to the new position N. For example, the user apparatus 40 update the position of the vehicle marker to the new position N. For example, the user apparatus 40 may comprise means, such as the processor 42, memory 44, and/or the like, for updating the position of the vehicle marker to the new position N. For example, the current position C may be updated to be the new position N. For example, the animation object corresponding to the vehicle marker may be updated to indicate that the current position C is now the new position N. For example, the previous current position C may be overwritten with the new position N.

At block 218, the vehicle marker may be rendered at the new position N on the map displayed by the animation interface. For example, user apparatus 40 may render the vehicle marker at the new position N on the map displayed by the animation interface. For example, the user apparatus 40 may comprise means, such as the processor 42, user interface 48, and/or the like, for rendering the vehicle marker at the new position N on the map displayed by the animation interface. For example, the vehicle marker may be displayed at the new position N on the animation interface displayed via the user interface 48. Thus, the vehicle marker may be animated to move along the map displayed by the animation interface provided and/or displayed by the user interface 48.

If, at block 212, it is determined that the vehicle marker has reached the position of the way point W, the process continues to block 220. At block 220, the way point W is removed from the way point array. For example, the user apparatus 40 may remove the way point W from the way point array. For example, the user apparatus 40 may comprise means, such as the processor 42, memory 44, and/or the like, removing the way point W from the way point array. For example, the way point array may be updated to no longer include and/or comprise the way point W.

At block 222, it is determined if the way point array is now empty. For example, it is determined if the way point array is empty now that the way point W has been removed therefrom. For example, the user apparatus 40 may determine if the way point array is now empty. For example, the user apparatus 40 may comprise means, such as the processor 42, memory 44, and/or the like, for determining if the way point array is now empty. If it is determined, at block 222, that the way point array is now empty, the process may return to block 202 to wait for the triggering of the next animation frame update. If it is determined, at block 222, that the way point array is not empty, the process continues to block 224. At block 224, the position of the next way point W' is retrieved. For example, the user apparatus 40 may retrieve the position of the next way point W'. For example, the user apparatus 40 may comprise means, such as the processor 42, memory 44, and/or the like for retrieving the position of the next way point W'. For example, the next way point W' may be the way point in the way point array associated with the earliest capture time timestamp. For example, the position of the next way point W' may be retrieved from the way point array from the corresponding animation object.

At block 226, updated latitude and longitude steps or increments may be determined, calculated, and/or the like. For example, the user apparatus 40 may determine, calculate, and/or the like updated latitude and longitude steps or increments. For example, the user apparatus 40 may comprise means, such as the processor 42 and/or the like, for determining, calculating, and/or the like updated latitude and longitude steps or increments. For example, the updated latitude and longitude steps or increments may be determined based at least in part on the current marker position C and the position of the next way point W'. In an example embodiment, the updated latitude step or increment and the updated longitude step or increment are determined, calculated, and/or the like based on the current position C of the vehicle marker, the next way point W' of the way point array of the animation object, a frames per second rate for animating movement of the marker on the map, and a marker speed factor. For example, the updated latitude step or increment d'(lat) may be determined, calculated, and/or the like by determining the change in latitude Δ'(lat) between the current marker position C and the latitude of the next way point W' and multiplying the change in latitude by an adjustment factor $f_{adj}$. For example $d'(lat)=\Delta'(lat)*f_{adj}$, wherein $\Delta'(lat)=C(lat)-W'(lat)$, with W'(lat) being the latitude component of the position of the next way point W'. In an example embodiment, the adjustment factor is determined based on the frames per second rate $R_{fps}$, the marker speed factor $f_{ms}$, $f_{ms}'$, and/or the like. For example, in one embodiment $$f_{adj} = \begin{cases} (\text{size(way point array)} - 1) * f_{ms}/R_{fps} & \text{size(way point array)} > 1 \\ f_{ms}'/R_{fps}, & \text{otherwise} \end{cases},$$

wherein $f_{ms}=R/(Q*S)$, wherein $1<R<2$, $Q>1$, and S is the reciprocal of the request rate (e.g., the rate at which the user apparatus 40 provides the network and/or API requests) and $f_{ms}'=1/(Q*S)$. The updated longitude step or increment d'(long) may be determined, calculated, and/or the like in a similar manner. Thus, in an example embodiment, the updated latitude and longitude steps or increments may be determined and/or calculated based on the change in position between the current marker position C of the vehicle marker and the next way point W', the frames per second rate $R_{fps}$, the marker speed factor $f_{ms}$, $f_{ms}'$. In an example embodiment, the frames per second rate $R_{fpm}=10$ Hz and the request rate $1/S=1$ Hz. In various embodiments, the frames per second rate $R_{fps}$ may vary from, for example, 60 Hz to 2 Hz and the request rate 1/S may vary from, for example, 10 Hz to 0.1 Hz. In various embodiments, the request rate 1/S is slower or substantially slower than the frames per second rate $R_{fps}$. In an example embodiment, the marker speed factor $f_{ms}$, $f_{ms}'$ may be configured to adjust the speed at which the vehicle marker is moved across the animation interface. For example, if the way point array includes a large number of way points, it is desired to increase the speed at which the vehicle marker moves across the animation interface such that the position of the vehicle marker on the animation interface better reflects the real time or near real time position of the corresponding probe apparatus 20 and/or vehicle 5. The marker speed factor may further be configured to prevent the vehicle marker from reaching the last way point in the way point array and then pausing while the user apparatus requests, receives, and/or process new requested information/data. Thus, the marker speed factor is configured to provide smooth animation (e.g., an animation that does not regularly jump and pause) of the vehicle marker along the map displayed via the animation interface to provide a good representation of a probe apparatus 20 and/or vehicle's real time and/or near real time position. Moreover, the marker speed factor allows for smooth animation of the vehicle marker along a map displayed by the animation interface while reducing the number of network and/or API requests need to ensure the smooth animation. In an example embodiment, the latitude and longitude steps or increments of the corresponding animation object may be overwritten with the updated latitude and longitude steps or increments.

At block 228, the new position N is determined, calculated, and/or the like. For example, the user apparatus 40 may determine, calculate, and/or the like, the new position N. For example, the user apparatus 40 may comprise means, such as the processor 42 and/or the like, for determining, calculating the new position N. For example, the new position N may be calculated by adding the updated latitude step or increment d'(lat) to the latitude component of the current position C(lat) to determine the latitude component of the new position N(lat) and adding the updated longitude step or increment d'(long) to the longitude component of the current position C(long) to determine the longitude component of the new position N(long). In other words, N(lat)=C(lat)+d'(lat) and N(long)=C(long)+d'(long). Once the new position N is determined, the process continues to block 216.

Figure 5A:
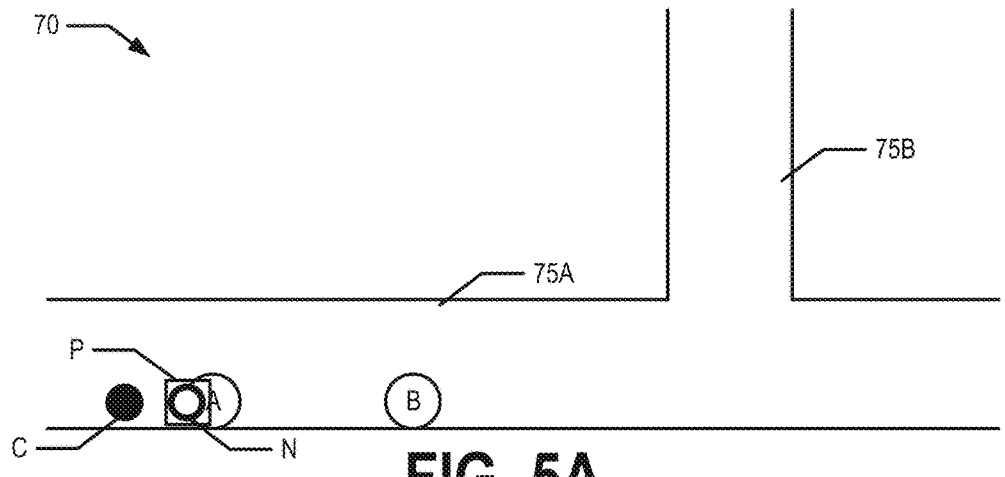

FIGS. 5A, 5B, 5C, 5D, and 5E provide a schematic illustration of how a vehicle marker 60 may be moved along road segments 75 (e.g., 75A, 75B) of a map 70. FIG. 5A shows a vehicle marker as a filled circle at the current position C, a way point A of the way point array at the first way point position and way point B of the way point array at the second way point position. The proposed new position is located at position P, shown as a square in FIG. 5A. The proposed new position P is generated, for example by the user apparatus 40, by adding the latitude step or increment d(lat) to the latitude component of the current position C(lat) and adding the longitude step or increment d(long) to the longitude component of the current position C(long). As can be seen in FIG. 5A, the distance between the current position C and the position of way point A is greater than the distance between the proposed new position P and the position of way point A. Thus, the proposed new position P is returned as the new position N, shown as the solid circle. The corresponding animation object is updated to reflect that the current position C is now the new position N and the vehicle marker (e.g., shown as the solid circle) is moved to the new position N, for example by the user apparatus 40.

Figure 5B:
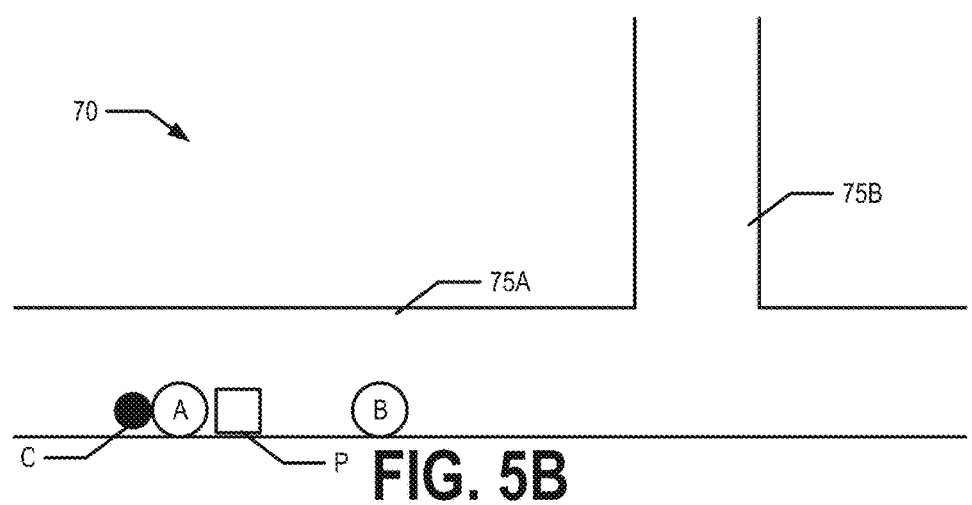
Figure 5C:
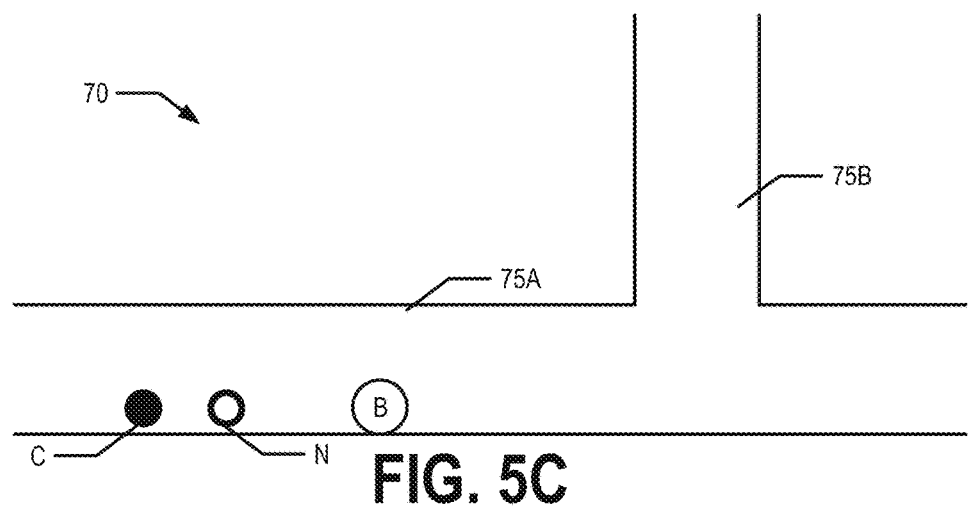

FIG. 5B shows the next update of the animation in accordance with the animation frames per second rate $R_{fps}$. The vehicle marker 60 is at the current position C, which is the new position N from the previous update. The proposed new position P, shown as a square, is generated by adding the latitude step or increment d(lat) to the latitude component of the current position C(lat) and adding the longitude step or increment d(long) to the longitude component of the current position C(long), for example by the user apparatus 40. As can be seen in FIG. 5B, the distance between the current position C (e.g., the location of the vehicle marker shown by the filled circle) and the position of way point A is not greater than the distance between the proposed new position P and the position of way point A. In response to determining that the distance between the current position C and the position of way point A is not greater than the distance between the proposed new position P and the position of way point A, the way point A is removed from the way point array. As the way point array is not empty (e.g., the way point array still comprises the way point B), an updated latitude step or increment d'(lat) and an updated longitude step or increment d'(long) are determined are determined based on the current marker position C, the position of way point B, and an adjustment factor. In an example embodiment, the adjustment factor is determined based on the frames per second rate $R_{fps}$, the marker speed factor $f_{ms}$, $f_{ms}'$, and/or the like. The updated latitude and longitude steps or increments are used to determine the new position N, shown in FIG. 5C. For example, the new position N is generated by adding the updated latitude step or increment d'(lat) to the latitude component of the current position C(lat) and adding the updated longitude step or increment d'(long) to the longitude component of the current position C(long), for example by the user apparatus 40. The corresponding animation object is then updated to reflect that the current position C is now the new position N, that the latitude step or increment is now the updated latitude step or increment, that the longitude step or increment is now the updated longitude step or increment, and the vehicle marker 60 is moved to the new position N, for example by the user apparatus 40.

Figure 5D:
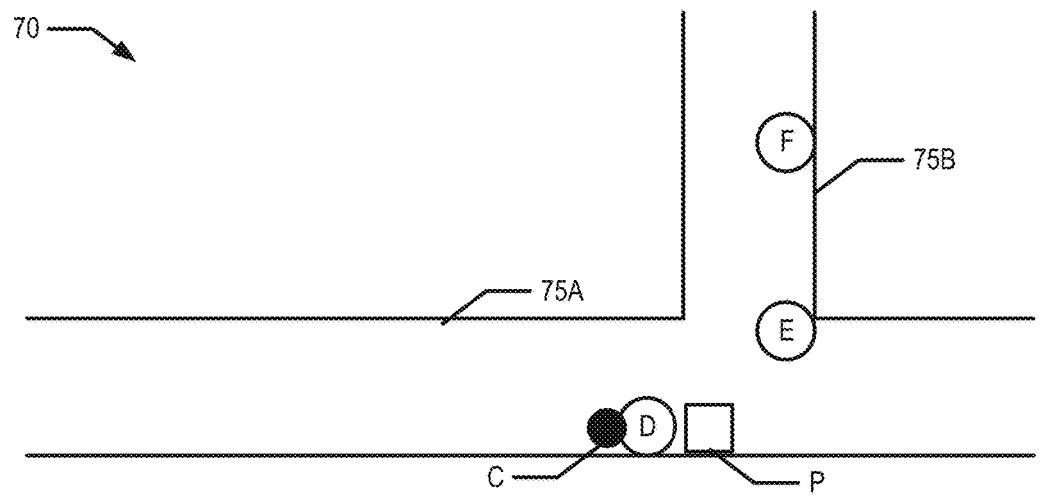
Figure 5E:
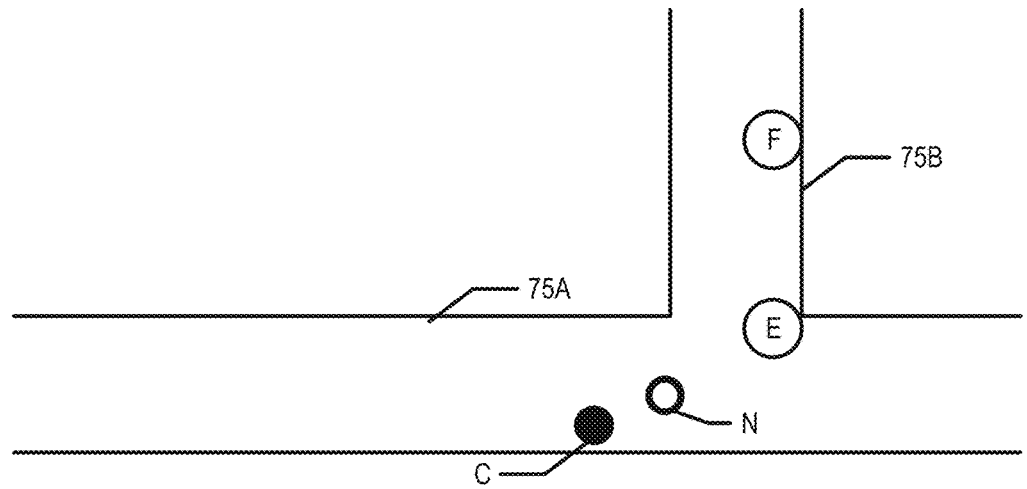

FIG. 5D shows another example update of the animation during which the vehicle marker 60 must navigate a turn. At the time of the illustrated update, the way point array comprises way point D, a way point E, and a way point F. The vehicle marker (shown as the solid circle) is at the current position C. The proposed new position P (shown as a square) is generated by adding the latitude step or increment d(lat) (which is the updated latitude step or increment from a previous update) to the latitude component of the current position C(lat) and adding the longitude step or increment d(long) (which is the updated longitude step or increment from a previous update) to the longitude component of the current position C(long), for example by the user apparatus 40. As can be seen in FIG. 5D, the distance between the current position C and the position of way point D is not greater than the distance between the proposed new position P and the position of way point D. In response to determining that the distance between the current position C and the position of way point D is not greater than the distance between the proposed new position P and the position of way point D, way point D is removed from the way point array. As the way point array is not empty (e.g., the way point array still comprises way point E and way point F), an updated latitude step or increment d'(lat) and an updated longitude step or increment d'(long) are determined based on the current marker position C, the position of way point E, and an adjustment factor. In an example embodiment, the adjustment factor is determined based on the frames per second rate $R_{fps}$, the marker speed factor $f_{ms}$, $f_{ms}'$, and/or the like. The updated latitude and longitude steps or increments are used to determine the new position N, shown in FIG. 5E as the solid circle. For example, the new position N is generated by adding the updated latitude step or increment d'(lat) to the latitude component of the current position C(lat) and adding the updated longitude step or increment d'(long) to the longitude component of the current position C(long), for example, by the user apparatus 40. The corresponding animation object is then updated to reflect that the current position C is now the new position N, that the latitude step or increment is now the updated latitude step or increment, that the longitude step or increment is now the updated longitude step or increment, and the vehicle marker is moved to the new position N, for example by the user apparatus 40.

In an example embodiment, the animation may continue to be updated in accordance with the animation frame per second rate $R_{fps}$ until the probe apparatus 20 and/or vehicle 5 reach a predetermined destination (e.g., rideshare pick-up location, and/or the like), the user apparatus 40 receives user input (e.g., via the user interface 48) closing the animation interface, and/or the like.

As noted above, example embodiments of the present invention provide an improvement to computer-related technology. In particular, an example embodiment allows the user apparatus 40 to provide network and/or API requests to the network apparatus at a slower rate than traditional smooth animation techniques while still providing the user with a smooth animation representing the real time or near real time position of the probe apparatus 20 and/or vehicle 5.

III. Example Apparatus

The probe apparatus 20, user apparatus 40, and/or network apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the probe apparatus 20, user apparatus 40, and/or network apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2A depicts a network apparatus 10, FIG. 2B depicts a probe apparatus 20, and FIG. 2C depicts a user apparatus 40 of an example embodiment that may be embodied by various computing devices including those identified above. As shown, the network apparatus 10 of an example embodiment may include, may be associated with or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22, and a memory device 24, and optionally a communication interface 26, a user interface 28, one or more sensors 30 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. Moreover, as shown, the user apparatus 40 of an example embodiment may include, may be associated with or may otherwise be in communication with a processor 42 and a memory device 44 and optionally a communication interface 46 and/or a user interface 48.

In some embodiments, the processor 12, 22, 42 (and/or co-processors or any other processing circuitry assisting or otherwise associated with the processor) may be in communication with the memory device 14, 24, 44 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, user apparatus 40, and/or probe apparatus 20 may be embodied by a computing device. However, in some embodiments, the apparatus may be embodied as a chip or chip set. In other words, an apparatus 10, 20, 40 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 42 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22, 42 may be configured to execute instructions stored in the memory device 14, 24, 44 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, user apparatus 40, and/or probe apparatus 20 may include a user interface 18, 28, 48 that may, in turn, be in communication with the processor 12, 22, 42 to provide output to the user, such as a proposed route, animation representing the real time or near real time position of a probe apparatus 20 and/or vehicle 5 and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, 44 and/or the like).

The network apparatus 10, user apparatus 40, and/or the probe apparatus 20 may optionally include a communication interface 16, 26, 46. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, user apparatus 40, and/or probe apparatus 20 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map and/or link, and/or the like. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the probe apparatus 20 and/or user apparatus

40 may be configured to execute computer-executable instructions provided by and/or referred to by a data record. In an example embodiment, the network apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, vehicle lane patterns, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more probe apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, user apparatus 40, and/or probe apparatus 20 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of user apparatuses 40, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 44 of an apparatus employing an embodiment of the present invention and executed by the processor 12, 22, 42 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   displaying a map and a marker corresponding to an object of interest via a user interface of a user apparatus, wherein (a) the marker is displayed on the map at a current marker position and (b) the user apparatus comprises a communication interface and a processor;
   receiving requested data by the user apparatus, the requested data comprising at least one instance of location data corresponding to the object of interest, wherein the location data is generated at least in part by a probe apparatus corresponding to the object of interest, wherein (a) the requested data is received in response to a request for location data and (b) the user apparatus requests the requested data at a request rate;
   adding at least one way point to a way point array corresponding to the object of interest based on the at least one instance of location data;
   determining a latitude step and a longitude step based on (a) the current marker position, (b) a first way point of the way point array, and (c) an adjustment factor; and
   updating the current marker position and rendering the marker on the map at the updated current marker position in accordance with a frames per second rate for animating the movement of the marker on the map, wherein (a) the request rate is slower than the frames per second rate and (b) the updating of the current marker position and the rendering of the marker on the map at the updated current marker position comprises:
      determining a new marker position based on the current marker position and the latitude and longitude steps,
      setting the current marker position to the new marker position, and
      rendering the marker at the new marker position via the user interface.

2. A method according to claim 1, wherein the adjustment factor is determined based on (a) a number of way points in the way point array, (b) the frames per second rate for animating the movement of the marker on the map, (c) a marker speed factor, and (d) the request rate.

3. A method according to claim 1, wherein determining the new marker position comprises adding the latitude step to a latitude component of the current marker position and adding the longitude step to a longitude component of the current marker position.

4. A method according to claim 3, wherein determining the new marker position further comprises:
   determining whether a linear distance between the new marker position and the first way point is greater than the linear distance between the current marker position and the first way point;
   in response to determining that the linear distance between the new marker position and the first way point is not greater than the linear distance between the current marker position and the first way point, setting the current marker position to the new marker position; and
   in response to determining that the linear distance between the new marker position and the first way point is greater than the linear distance between the current marker position and the first way point:
      removing the first way point from the way point array,
      determining an updated latitude step and an updated longitude step based on (a) the current marker position, (b) a second way point of the way point array, and (c) the adjustment factor,
      determining the new marker position based on the current marker position and the updated latitude and longitude steps, and
      setting the current marker position to the new marker position.

5. A method according to claim 1, wherein the adjustment factor is determined at least in part based on a number of way points in the way point array.

6. An apparatus comprising a user interface, a communication interface, at least one processor, and at least one memory storing computer program code, with the at least one memory and the computer program code configured to, with the processor, cause the apparatus to at least:
   display a map and a marker corresponding to an object of interest via the user interface, wherein the marker is displayed on the map at a current marker position;
   receive requested data via the communication interface, the requested data comprising at least one instance of location data corresponding to the object of interest, wherein the location data is generated at least in part by a probe apparatus corresponding to the object of interest wherein (a) the requested data is received in response to a request for location data and (b) the user apparatus requests the requested data at a request rate;
   add at least one way point to a way point array corresponding to the object of interest based on the at least one instance of location data;
   determine a latitude step and a longitude step based on (a) the current marker position, (b) a first way point of the way point array, and (c) an adjustment factor; and
   update the current marker position and rendering the marker on the map at the updated current marker position in accordance with a frames per second rate for animating the movement of the marker on the map, wherein (a) the request rate is slower than the frames per second rate and (b) the updating of the current marker position and the rendering of the marker on the map at the updated current marker position comprises:
      determining a new marker position based on the current marker position and the latitude and longitude steps, setting the current marker position to the new marker position, and rendering the marker at the new marker position via the user interface.

7. An apparatus according to claim 6, wherein the adjustment factor is determined based on (a) a number of way points in the way point array, (b) the frames per second rate for animating the movement of the marker on the map, (c) a marker speed factor, and (d) the request rate.

8. An apparatus according to claim 6, wherein determining the new marker position comprises adding the latitude step to a latitude component of the current marker position and adding the longitude step to a longitude component of the current marker position.

9. An apparatus according to claim 8, wherein to determine the new marker position, the at least one memory and the computer program code configured to, with the processor, cause the apparatus to at least:

determine whether a linear distance between the new marker position and the first way point is greater than the linear distance between the current marker position and the first way point;

in response to determining that the linear distance between the new marker position and the first way point is not greater than the linear distance between the current marker position and the first way point, set the current marker position to the new marker position; and in response to determining that the linear distance between the new marker position and the first way point is greater than the linear distance between the current marker position and the first way point:

remove the first way point from the way point array, determine an updated latitude step and an updated longitude step based on (a) the current marker position, (b) a second way point of the way point array, and (c) the adjustment factor, determine the new marker position based on the current marker position and the updated latitude and longitude steps, and set the current marker position to the new marker position.

10. An apparatus according to claim 6, wherein the adjustment factor is determined at least in part based on a number of way points in the way point array.

11. A computer program product comprising at least one non-transitory computer-readable storage medium having computer-executable program code instructions stored therein with the computer-executable program code instructions comprising program code instructions configured to:

display a map and a marker corresponding to an object of interest via a user interface of a user apparatus, wherein (a) the marker is displayed on the map at a current marker position and (b) the user apparatus comprises a communication interface and a processor;

receive requested data at the user apparatus, the requested data comprising at least one instance of location data corresponding to the object of interest, wherein the location data is generated at least in part by a probe apparatus corresponding to the object of interest, wherein (a) the requested data is received in response to a request for location data and (b) the user apparatus requests the requested data at a request rate;

add at least one way point to a way point array corresponding to the object of interest based on the at least one instance of location data;

determining a latitude step and a longitude step based on (a) the current marker position, (b) a first way point of the way point array, and (c) an adjustment factor; and update the current marker position and rendering the marker on the map at the updated current marker position in accordance with a frames per second rate for animating the movement of the marker on the map, wherein (a) the request rate is slower than the frames per second rate and (b) the updating of the current marker position and the rendering of the marker on the map at the updated current marker position comprises:

determining a new marker position based on the current marker position and the latitude and longitude steps, setting the current marker position to the new marker position, and rendering the marker at the new marker position via the user interface.

12. A computer program product according to claim 11, wherein the adjustment factor is determined based on (a) a number of way points in the way point array, (b) the frames per second rate for animating the movement of the marker on the map, (c) a marker speed factor, and (d) the request rate.

13. A computer program product according to claim 11, wherein determining the new marker position comprises adding the latitude step to a latitude component of the current marker position and adding the longitude step to a longitude component of the current marker position.

14. A computer program product according to claim 13, wherein to determine the new marker position, the computer-executable program code instructions comprise program code instructions configured to:

determine whether a linear distance between the new marker position and the first way point is greater than the linear distance between the current marker position and the first way point;

in response to determining that the linear distance between the new marker position and the first way point is not greater than the linear distance between the current marker position and the first way point, set the current marker position to the new marker position; and in response to determining that the linear distance between the new marker position and the first way point is greater than the linear distance between the current marker position and the first way point:

remove the first way point from the way point array, determine an updated latitude step and an updated longitude step based on (a) the current marker position, (b) a second way point of the way point array, and (c) the adjustment factor, determine the new marker position based on the current marker position and the updated latitude and longitude steps, and set the current marker position to the new marker position.

15. A computer program product according to claim 11, wherein the adjustment factor is determined at least in part based on a number of way points in the way point array.

* * * * *